(12) United States Patent
Hasegawa et al.

(10) Patent No.: US 10,132,430 B1
(45) Date of Patent: Nov. 20, 2018

(54) COUPLING CLAMP

(71) Applicants: NIFCO AMERICA CORP., Canal Winchester, OH (US); TOYOTA MOTOR ENGINEERING & MANUFACTURING NORTH AMERICA, INC., Erlanger, KY (US)

(72) Inventors: Takahiro Hasegawa, Canal Winchester, OH (US); Hayato Shimizu, Erlanger, KY (US)

(73) Assignees: NIFCO AMERICA CORP., Canal Winchester, OH (US); TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/686,878

(22) Filed: Aug. 25, 2017

(51) Int. Cl.
*F16L 3/227* (2006.01)
*F16L 3/10* (2006.01)

(52) U.S. Cl.
CPC .............. *F16L 3/227* (2013.01); *F16L 3/10* (2013.01)

(58) Field of Classification Search
CPC ................... F16M 5/00; F16L 3/222
See application file for complete search history.

(56) References Cited

U.S. PATENT DOCUMENTS

| 4,099,626 A | * | 7/1978 | Magnussen, Jr. | ...... | A47B 63/02 211/194 |
| 5,076,534 A | * | 12/1991 | Adam | ...................... | F16M 5/00 248/678 |
| 8,342,474 B2 | * | 1/2013 | Gilbreath | ................ | F16L 3/222 165/162 |

FOREIGN PATENT DOCUMENTS

| JP | H07-243560 A | 9/1995 |
| JP | 5125321 B2 | 1/2013 |

* cited by examiner

*Primary Examiner* — Amy J. Sterling
(74) *Attorney, Agent, or Firm* — Manabu Kanesaka

(57) ABSTRACT

A coupling clamp includes a pair of holding members for holding a pair of tubular members to be arranged parallel to each other. The pair of holding members includes a first holding member having an engaging portion extending vertically from one side surface of the first holding member, and a second holding member having an engaged portion extending vertically from one side surface of the second holding member facing the one side surface of the first holding member. The engaging portion and the engaged portion are engaged in a vertical direction relative to a length direction of the pair of holding members such that the first holding member relatively slides to the second holding member and the first holding member is arranged adjacent to the second holding member.

11 Claims, 9 Drawing Sheets

COUPLING CLAMP

FIELD OF THE INVENTION

The present invention relates to a coupling clamp for holding tubular members to be arranged parallel to each other. More specifically, the present invention relates to a coupling clamp for holding tubular members to reduce a distance between axes of the tubular members and to protect the tubular members from an impact generated in collision of a vehicle, with holding the tubular members to be arranged parallel to each other.

BACKGROUND ART

Generally, in a vehicle, a fuel tube forming a fuel line extends between a fuel tank and an engine. The fuel tube includes a fuel pipe made of metal and attached to the fuel tank, and a fuel hose made of a flexible material attached to the engine. The fuel pipe and the fuel hose are connected through a tube connector, such as a quick connector by inserting ends of the fuel pipe and the fuel hose therein.

A coupling clamp is installed to hold two fuel tubes, i.e. a main tube and a return tube, each having the fuel pipe and the fuel hose, to be arranged parallel to each other. Specifically, the coupling clamp holds the two fuel tubes with the tube connectors, each connecting the fuel pipe and the fuel hose, such that the main tube and the return tube are arranged parallel to each other.

For example, as a related art of the coupling clamp, Patent Document 1 discloses a coupling member for holding a pair of fuel tubes to be arranged parallel to each other. The coupling member includes a right side holding member and a left side holding member, each holding the fuel tube, and the right side holding member and the left side holding member are connected through a locking projection part on the right side holding member and a locking hole in the left side holding member.

As another related art of the coupling clamp, Patent Document 2 discloses a clamp for holding a pair of fuel tubes to be arranged parallel to each other. The clamp includes a pair of holding portions, each holding a connector portion of the fuel tube, and the pair of holding portions is connected to each other through an engaging portion extending horizontally from one holding portion and an engaged portion extending horizontally from the other holding portion.

Problems to be Solved by the Invention

Although the coupling member and the clamp, disclosed in the Patent Documents 1 and 2, hold the pair of fuel tubes to be arrange parallel to each other, there are difficulties to hold the pair of fuel tubes.

Usually, the fuel pipe and the fuel hose are connected through the tube connector; therefore, a connecting position connecting the fuel pipe and the fuel hose is set by a position of the tube connector. Also, in the coupling clamp, two tube connectors are held because there are two fuel tubes, i.e. the main tube and the return tube. The two tube connectors are basically arranged adjacent to each other in a horizontal or vertical direction to be held in the coupling clamp, i.e. the two connectors of the main tube and the return tube are arranged at the same position in a length direction of the fuel tube; therefore, the fuel pipes of the main tube and the return tube are connected to the tube connectors at the same position in the length direction of the fuel tube, and the fuel hoses of the main tube and the return tube are connected to the tube connectors at the same position in the length direction of the fuel tube.

However, the fuel tube, i.e. the fuel pipe and the fuel hose, extending between the fuel tank and the engine is long, leading to high possibility of positional variation. Especially, since the fuel pipe is formed of metal, deforming the fuel pipe to adjust the connecting position is difficult. Thus, it is difficult to make the main tube and the return tube have the connecting positions adjacent to each other in the length direction of the fuel tube.

Therefore, there may have a displacement between the connecting positions of the main tube and the return tube, and it causes a case in which either the fuel pipe and the fuel hose of the main tube or those of the return tube are unable to be connected in one coupling clamp having the same connecting portions in the length direction of the fuel tube.

The coupling member, disclosed in the Patent Document 1, does not have a structure to correct the displacement between the connecting positions because the right side holding member and the left side holding member are connected tightly through the locking projection part and the locking hole. Therefore, if the displacement is too large, the fuel pipe and the fuel hose are unable to be connected in the coupling member, or the coupling member is unable to hold both of the two fuel tubes.

In contrast, the clamp, disclosed in the Patent Document 2, has a structure to correct the displacement between the connecting positions because the engaging portion slides relative to the engaged portion. More specifically, a locking hook of the engaging portion slides in an engaged hole of the engaged portion in an engagement state in which the engaging portion and the engaged portion are engaged each other.

However, the engaging portion and the engaged portion are engaged in a horizontal direction of the clamp, i.e. the engaging portion and the engaged portion respectively have large widths in the horizontal direction of the clamp; thereby, a size of the clamp is increased in the horizontal direction. In the structure of the clamp, it is hard to install the clamp in a limited space, and design of peripheral parts is restricted because installation of the clamp requires a large space.

Also, in the coupling member and the clamp, disclosed in the Patent Documents 1 and 2, there are difficulties to protect the pair of fuel tubes from an impact generated in collision of a vehicle.

In the coupling member and the clamp, disclosed in the Patent Documents 1 and 2, the pair of fuel tubes is exposed through insertion holes into which the pair of fuel tubes is inserted to be held in the coupling member, i.e. an upper side of the pair of fuel tubes is not protected; therefore, when the impact is generated in a collision of the vehicle, the pair of fuel tubes is damaged from the upper side.

In order to solve the above difficulties, the present invention has been made, and it is an object of the present invention to provide a coupling clamp having a structure to be installed in the limited space with correcting the displacement of the fuel tubes, and a cover member to protect the pair of fuel tubes.

Other objects and advantages of the invention will be apparent from the following description of the invention.

RELATED ART DOCUMENTS

Patent Document 1: Japanese Patent Application Publication No. H07-243560.
Patent Document 2: Japanese Patent No. 5125321.

SUMMARY OF THE INVENTION

In a first aspect of the present invention, a coupling clamp includes a pair of holding members for holding a pair of tubular members, such as fuel tubes and hoses, to be arranged parallel to each other. The pair of holding members includes a first holding member having an engaging portion extending vertically from one side surface of the first holding member, and a second holding member having an engaged portion extending vertically from one side surface of the second holding member facing the one side surface of the first holding member. The engaging portion and the engaged portion are engaged in a vertical direction relative to a length direction of the pair of holding members such that the first holding member relatively slides to the second holding member, and the first holding member is arranged adjacent to the second holding member. In the structure of the first aspect of the present invention, the coupling clamp corrects displacement of the pair of tubular members because the first holding member relatively slides to the second holding member, and the coupling clamp is miniaturized such that the pair of tubular members is arranged adjacent to each other.

In a second aspect of the present invention, the engaged portion includes an engaged hole in which the engaging portion is inserted, and the engaging portion has a width smaller than that of the engaged hole. In the structure, the engaging portion slides in the engaged hole because the engaging portion has a width smaller than that of the engaged hole.

In a third aspect of the present invention, the first holding member further includes at least one another engaging portion arranged apart from the engaging portion in the length direction of the pair of holding members. In the structure, the first holding member and the second holding member are tightly engaged each other.

In a fourth aspect of the present invention, the coupling clamp further includes a cover member covering upper portions of the pair of holding members, and the cover member includes a first fitting portion and a second fitting portion, the first holding member includes a first fitted portion on another side surface opposed to the one side surface to fit with the first fitting portion, and the second holding member includes a second fitted portion on another side surface opposed to the one side surface to fit with the second fitting portion. In the structure, there is no portion in the pair of holding members to expose the pair of tubular members; therefore, the pair of tubular members is protected from the impact generated in the collision of the vehicle.

In a fifth aspect of the present invention, the first fitted portion and the second fitted portion respectively have a first fitted hole portion and a second fitted hole portion in which the first fitting portion and the second fitting portion are inserted, and the first fitted hole portion or the second fitted hole portion has a width greater than that the first fitting portion or the second fitting portion. In the structure, the first fitting portion or the second fitting portion relatively slides in the first fitted hole portion or the second fitted hole portion in conjunction with relative slide between the first holding member and the second holding member.

In a sixth aspect of the present invention, the first holding member or the second holding member includes a positioning member, and the cover member includes a locking portion engaged with the positioning member. In the structure, the cover member is properly positioned on the pair of holding members.

DETAILED DESCRIPTION OF DISCLOSED

Hereinafter, an embodiment of the present invention will be explained with reference to FIGS. 1 to 5C. A coupling clamp of the present invention is not limited to the embodiment explained below.

First of all, an overall structure of an embodiment of the present invention will be explained with reference to FIG. 1.

Figure 1:
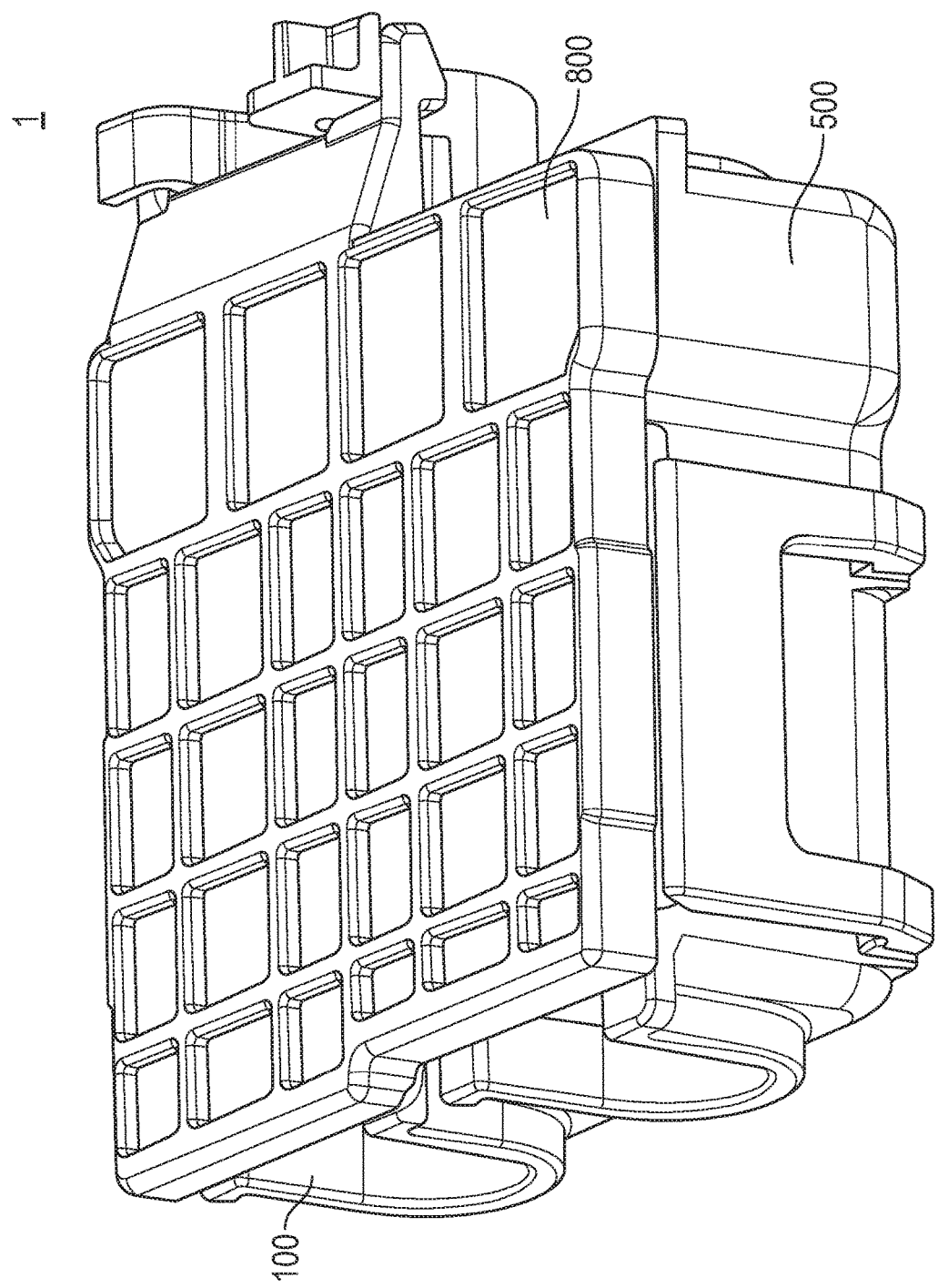
FIG. 1 is a top perspective view of a coupling clamp wherein a first holding member, a second holding member, and a cover member are engaged each other, in accordance with an embodiment of the present invention.

In FIG. 1, the coupling member 1 includes a first holding member 100, a second holding member 500, and a cover member 800. The first holding member 100 and the second holding member 500 are engaged to be arranged adjacent to each other, and the cover member 800 is engaged to the first holding member 100 and the second holding member 500 to cover upper portions of the first holding member 100 and the second holding member 500. The coupling member 1 holds fuel tubes to be arranged parallel to each other, and the coupling member is made of plastic material, e.g. polyacetal.

Figure 2A:
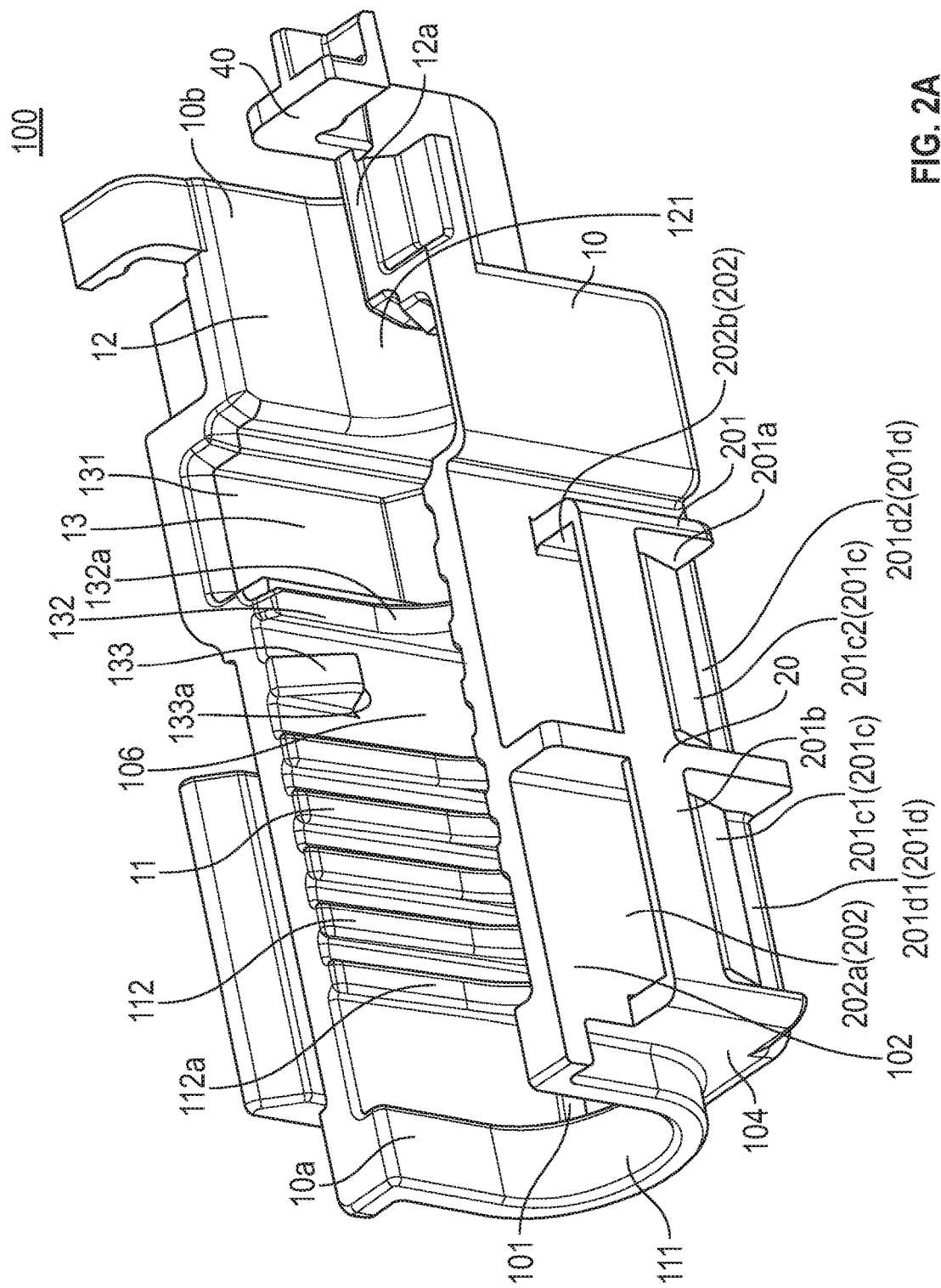
FIG. 2A is a right side perspective view of the first holding member in accordance with the embodiment of the present invention.
Figure 2B:
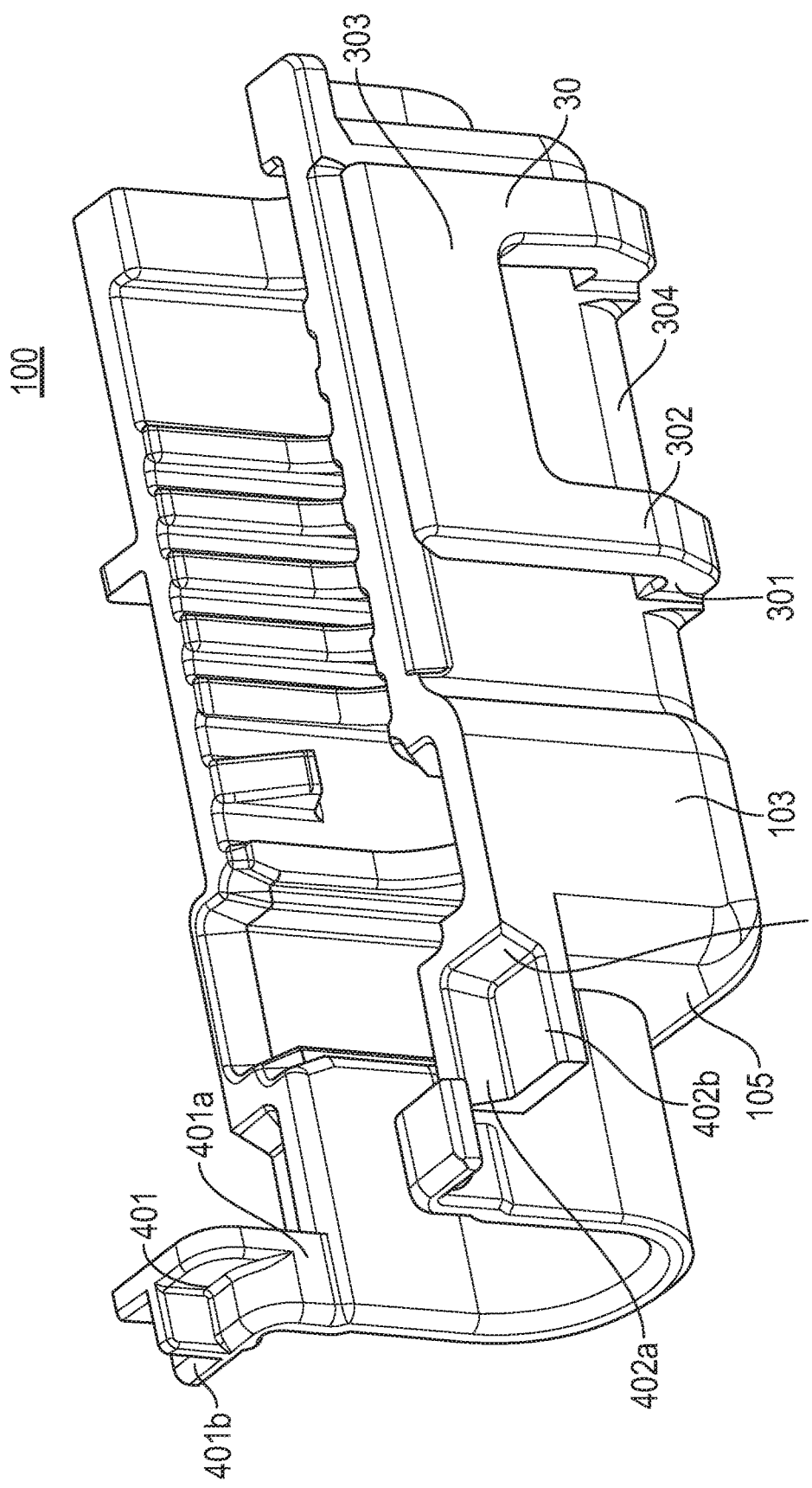
FIG. 2B is a left side perspective view of the first holding member in accordance with the embodiment of the present invention.

Detailed structure of each element will be explained hereinafter. The first holding member 100 will be explained with reference to FIGS. 2A, 2B, and 5A to 5C. The first holding member 100 is shaped in a substantial square cylinder-shape to hold a fuel tube and a tube connector therein; and includes a first holding portion 10, an engaged portion 20 formed on a first lateral portion 102 of the first holding portion 10, a first fitted portion 30 formed on a second lateral portion 103 of the first holding portion 10 opposed to the first lateral portion 102, and a positioning member 40 formed on a rear portion 10b of the first holding portion 10, as shown in FIGS. 2A and 2B.

The first holding portion 10 has a groove portion 106, in which the fuel tube and the tube connector are held, with an insertion opening opened upwardly. The groove portion 106 extends over an overall length of the first holding portion 10 in a length direction of the first holding member 100, and is surrounded by inner surfaces of a bottom portion 101, the first lateral portion 102, and the second lateral portion 103 of the first holding portion 10. The first holding portion 10 includes a first tube holding portion 11 holding a fuel hose extending from an engine, a second tube holding portion 12 holing a fuel pipe extending from a fuel tank, and a connector holding portion 13 holding the tube connector connecting the two fuel tubes. The first tube holding portion 11 is formed at a side of a front end 10a of the first holding portion 10, the second tube holding portion 12 is formed at a side of a rear portion 10b of the first holding portion 10, and the connector holding portion 13 formed between the first tube holding portion 11 and the second tube holding portion 12.

The first tube holding portion 11 includes a front end holding portion 111 formed at the front end 10a of the first holding portion 10, and a plurality of first tube holding pieces 112 arranged apart from the front end holding portion 111 in the length direction of the first holding member 100. The front end holding portion 111 protrudes outwardly from a front portion 104 of the first holding portion 10 in the length direction of the first holding member 100 to from a front flange portion, and a plurality of first tube holding pieces 112 protrudes inwardly from the inner surfaces of the bottom portion 101, the first lateral portion 102, and the second lateral portion 103 to form holding surfaces 112a on which the fuel tube extending from the fuel tank is held; and the front end holding portion 111 and the plurality of first tube holding pieces 112 have U-shaped cross sections in a width direction of the first holding member 100 perpendicular to the length direction thereof, respectively.

The second tube holding portion 12 includes a rear end holding portion 121 formed at the rear end 10b of the first holding portion 10, and protrudes outwardly from a rear portion 105 of the first holding portion 10 in the length direction of the first holding member 100 to form a rear flange portion; and the rear end holding portion 121 has a U-shaped cross section in the width direction of the first holding member 100 same as the front end holding portion 111. On an upper surface 12a of the second tube holding portion 12, the positioning member 40, explained later, is arranged.

The connector holding portion 13 includes a flange holding portion 131 integrally connected to the rear end holding portion 121 at one side thereof, a connector body holding piece 132 formed at the other side of the flange holding portion 131 opposed to the rear end holding piece 121, and locking pieces 133 formed between the connector body holding piece 132 and the plurality of first tube holding piece 112. The flange holding portion 131 has a width larger than those of the first tube holding portion 11 and the second tube holding portion 12 in the width direction of the first holding member 100 to hold a flange portion of the tube connector, the connector body holding piece 132 protrudes inwardly from the inner surfaces of the bottom portion 101, the first lateral portion 102, and the second lateral portion 103 to form a holding surface 132a on which a connector body portion of the tube connector is held, and the locking pieces 133 protrude inwardly from upper portions of the inner surfaces of the first lateral portion 102 and the second lateral portion 103 to form pressing surfaces 133a at bottom portions of the locking pieces 133, respectively. The pressing surfaces 133a press the tube connector downwardly to prevent a pull-out of the tube connector in the groove portion 106.

Figure 5A:
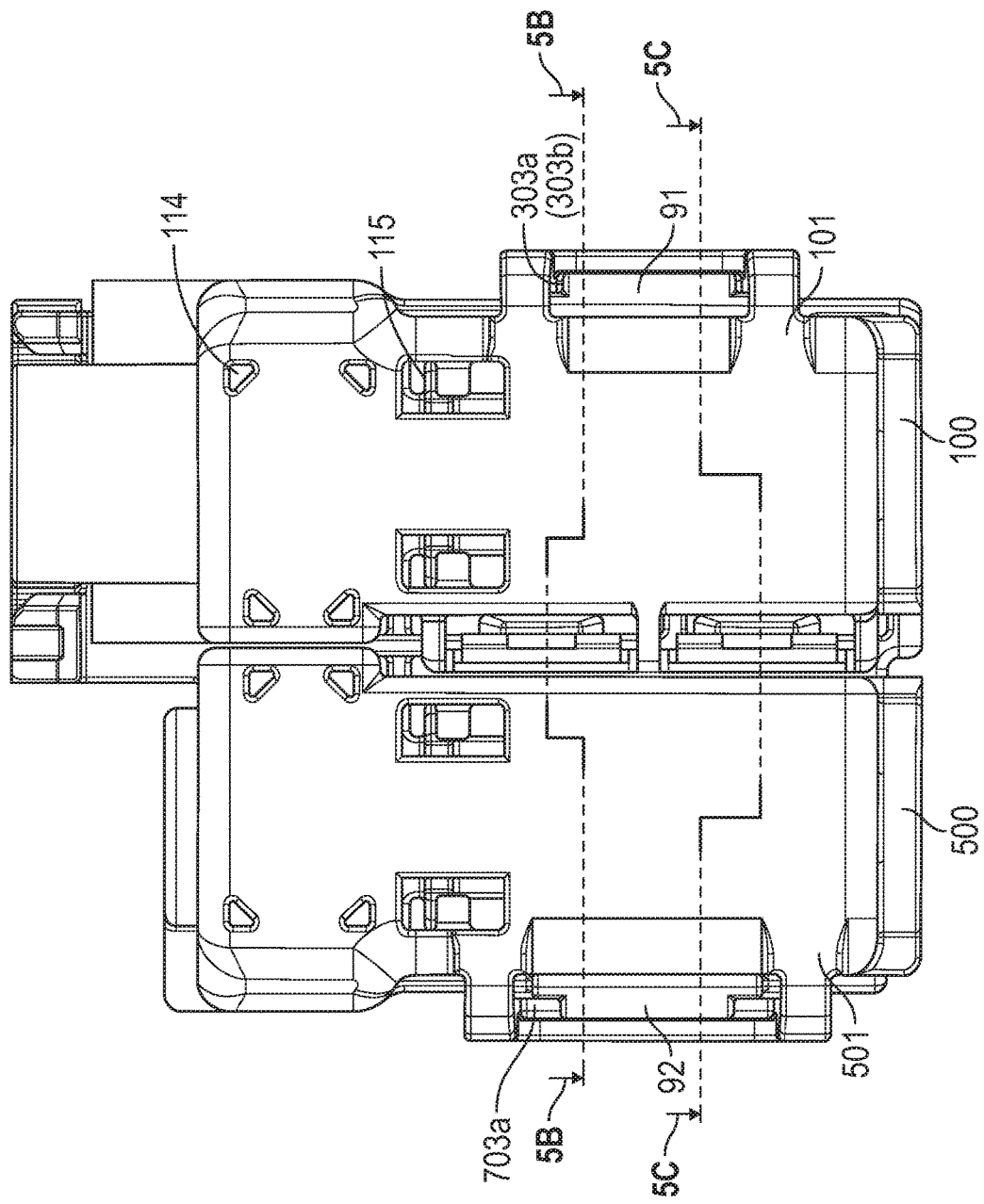
FIG. 5A is a bottom view of the coupling clamp in accordance with the embodiment of the present invention.
Figure 5B:
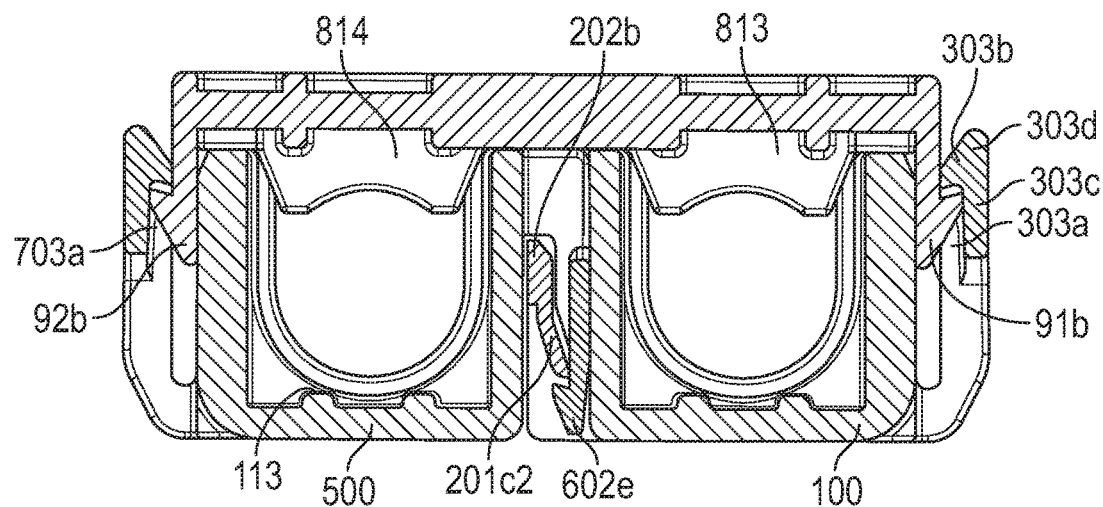
FIG. 5B is a sectional view of the coupling clamp in accordance with the embodiment of the present invention taken along line 5B-5B in FIG. 5A.
Figure 5C:
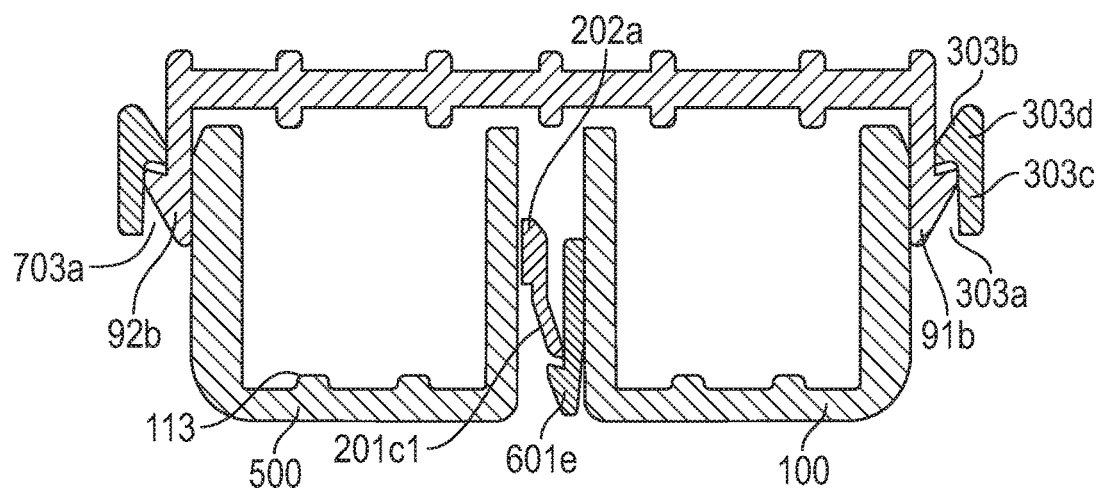
FIG. 5C is a sectional view of the coupling clamp in accordance with the embodiment of the present invention taken along line 5C-5C in FIG. 5A.

As shown in FIGS. 5A to 5C, the first holding portion 10 further includes ribs 113 on the inner surface of the bottom portion 101, through holes 114 in the bottom portion 101 forming the flange holding portion 131, and extraction holes 115 in the bottom portion 101 between the plurality of first tube holding piece 112 and the connector body holding piece 132. The ribs 113 extend from the front end holding portion 111 to the connector body holding piece 132 to enhance strength of the first holding portion 10, the through holes 114 are arranged at corners of the bottom portion 101 forming the flange holding portion 131 and penetrate through the bottom portion 101 to allow elastic deformation of the flange holding portion 131 caused by insertion and extraction of the tube connector, and the extraction holes 115 are arranged under the locking pieces 133 and penetrate through the bottom portion 101 to extract the tube connector from the groove portion 106.

The engaged portion 20 is formed on the first lateral portion 102 of the first holding portion 10. More specifically, the engaged portion 20 is formed on an outer surface of the first lateral portion 102 opposed to the inner surface of the first lateral portion 102 forming the first tube holding portion 11. The engaged portion 20 is engaged to an engaging portion 60 of the second holding member 500, explained later.

The engaged portion 20 has an engaged hole 202 surrounded by a frame portion 201, and a partition wall 203 partitioning the engaged hole 202 into a first engaged hole 202a and a second engaged hole 202b. The first engaged hole 202a and the second engaged hole 202b have lengths in the length direction of the first holding member 100 larger than those of a first engaging portion 601 and a second engaging portion 602 of the second holding member 500, explained later, such that the first engaging portion 601 and the second engaging portion 602 slide in the first engaged hole 202a and the second engaged hole 202b, respectively.

The frame portion 201 includes side plate portions 201a apart from each other in the length direction of the first holding member 100 to ensure lengths of the first engaged hole 202a and the second engaged hole 202b, and protruding outwardly from the outer surface of the first lateral portion 102; an outer plate portion 201b extending between the side plate portions 201a to face the outer surface of the first lateral portion 102; and a locking plate portion 201c extending downwardly from the outer plate portion 201b and inclined inwardly toward the outer surface of the first lateral portion 102 to lock the engaging portion 60 of the second holding member 500, explained later. The locking plate portion 201c is partitioned by the partition wall 203 into a first locking plate portion 201c1 and a second locking plate portion 201c2 as well as the engaged hole 202.

The outer plate portion 201b connects upper portions of the side plate portions to form a notch portion 201d between lower portions of the side plate portions 201a, and the notch portion 201d is partitioned by the partition wall 203 into a first notch portion 201d1 and a second notch portion 201d2. The partition wall 203 protrudes from an overall height of the outer surface of the first lateral portion 102, and the side plate portions 201a protrudes from a substantial half height of the outer surface of the first lateral portion 102, i.e. the partition wall 203 has a height larger than the side plate portions 201*a*; and as shown in FIGS. 5B and 5*c*, the locking plate portion 201*c* has a thickness thinner than that of the outer plate portion 201*b*.

The first fitted portion 30 is formed on the second lateral portion 103 of the first holding portion 10. More specifically, the first fitted portion 30 is formed on an outer surface of the second lateral portion 103 opposed to the inner surface of the second lateral portion 103 forming the first tube holding portion 11. The first fitted portion 30 is engaged to a first fitting portion 91 of the cover member 800, explained later.

The first fitted portion 30 includes protruding portions 301 arranged apart from each other in the length direction of the first holding member 100 and protruding outwardly from the outer surface of the second lateral portion 103, side portions 302 extending upwardly from ends of the protruding portions 301 to form L-shapes with the protruding portions 301, and a plate portion 303 extending between the side portions 301 to face the outer surface of the second lateral portion 103. The plate portion 303 connects upper portions of the side portions 302 to form a notch portion 304 between lower portions of the side portions 302, and as shown in FIGS. 5B and 5C, the plate portion 303 has a thickness thinner than those of the side portions 302 at a lower portion 303*c* of the plate portion 303 to form a depression portion 303*a* (hole portion); thereby, a step difference is formed between the upper portion 303*d* and the lower portion 303*d*, and the step difference forms an engaging claw portion 303*b* to engage the first fitting portion 91 of the cover member 800. The depression portion 303*a* has a depth in a thickness direction of the plate portion 303 to allow an first engaging claw portion 91*b* of the first fitting portion 91 to be entered therein, and the protruding portions 301 are arranged apart from each other in the length direction of the first holding member 100 to ensure the length of the depression portion 303*a* to fit the first engaging claw portion 91*b* of the first fitting portion 91.

The positioning member 40 is formed on the rear end holding portion 121 of the second tube holding portion 12 to engage a locking portion 83 of the cover member 800, explained later.

The positioning member 40 includes upper positioning members 401 protruding upwardly from the upper surface 12*a* of the second tube holding portion 12, and lower positioning members 402 formed at a corner between the rear end holding portion 121 and the flange holding portion 131. The upper positioning member 401 includes vertical portions 401*a* extending upwardly from rear ends of the upper surface 12*a* of the second tube holding portion 12, and horizontal portions 401*b* extending horizontally in a direction apart from each other from ends of the vertical portions 401*a* to form L-shapes with the vertical portions 401*a*. The lower positioning members 402 include supporting portions 402*a* positioned lower than the upper surface 12*a* of the second tube holding portion 12 in a height direction of the first holding member 100 to support the locking portion of the cover member 800, and connecting portions 402*b* connecting the upper surface 12*a* at the corner between the rear end holding portion 121 and the flange holding portion 131 and the supporting portions 402*a*. The locking portion 83 of the cover member 300 is sandwiched between bottom surfaces of the horizontal portions 401*b* and upper surfaces of the supporting portions 402*a* to engage the first holding member 100, explained later.

The second holding member 500 will be explained with reference to FIGS. 3A, 3B, and 5A to 5C.

Figure 3A:
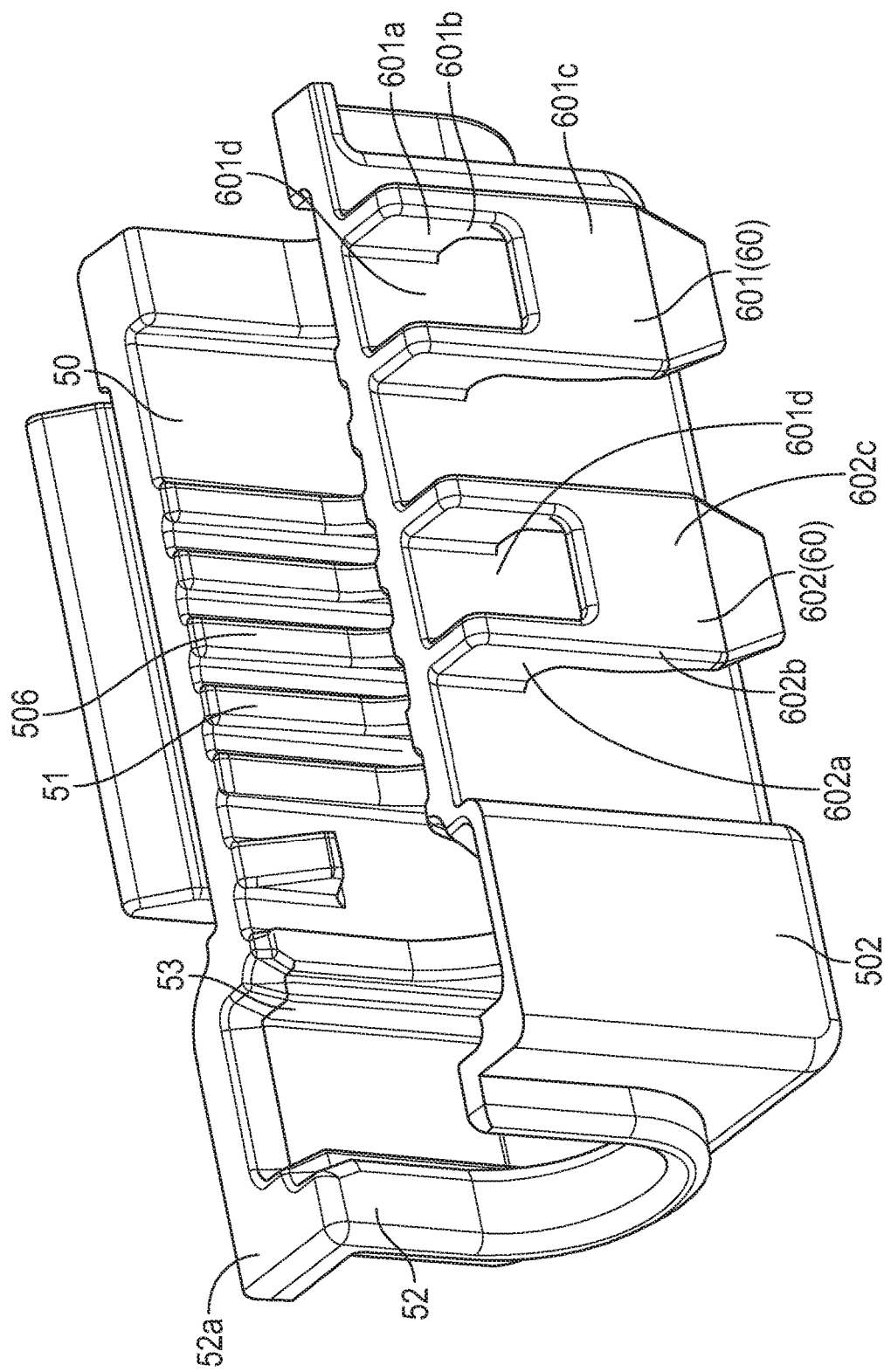
FIG. 3A is a left side perspective view of the second holding member in accordance with the embodiment of the present invention.
Figure 3B:
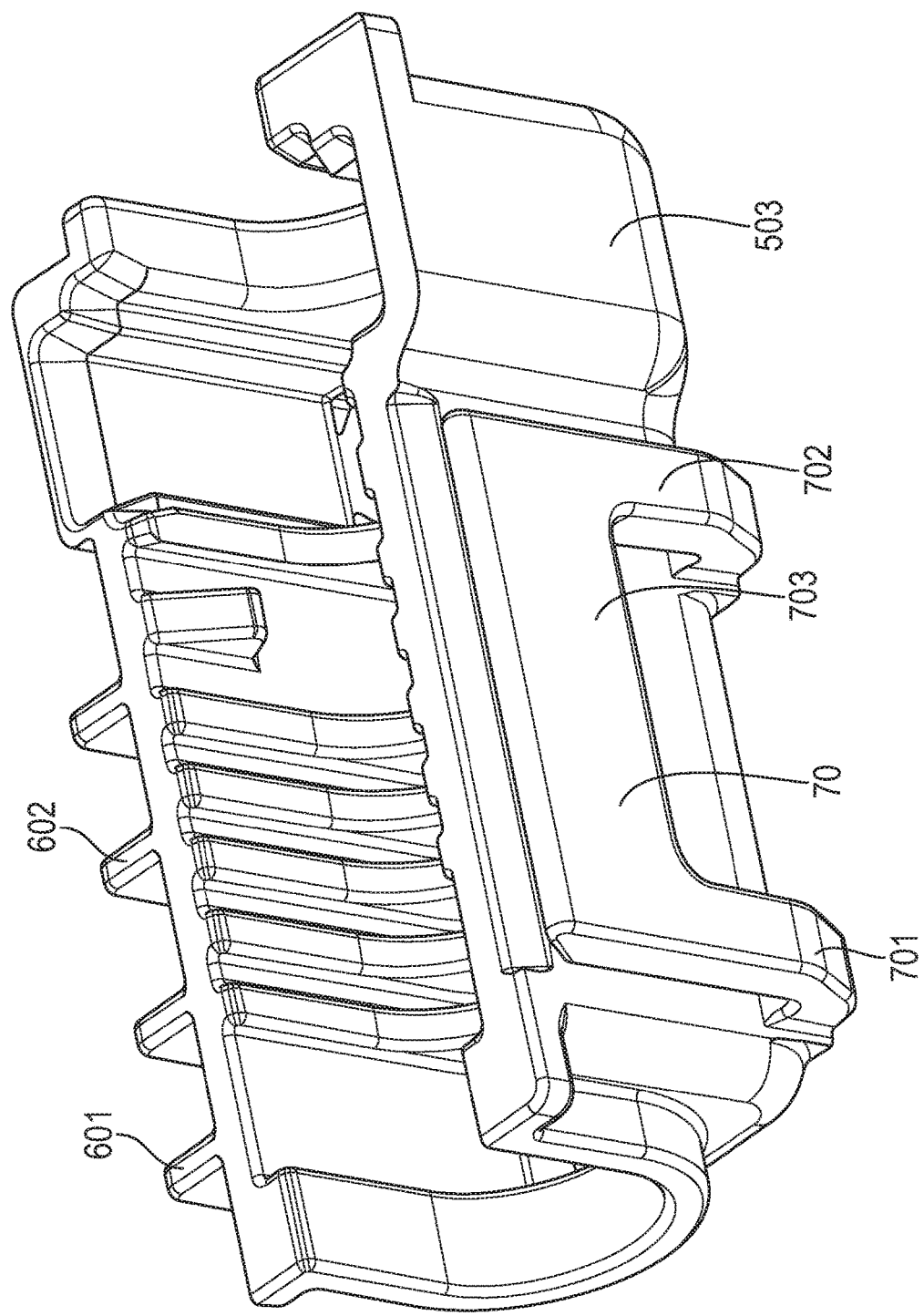
FIG. 3B is a right side perspective view of the second holding member in accordance with the embodiment of the present invention.
Figure 4A:
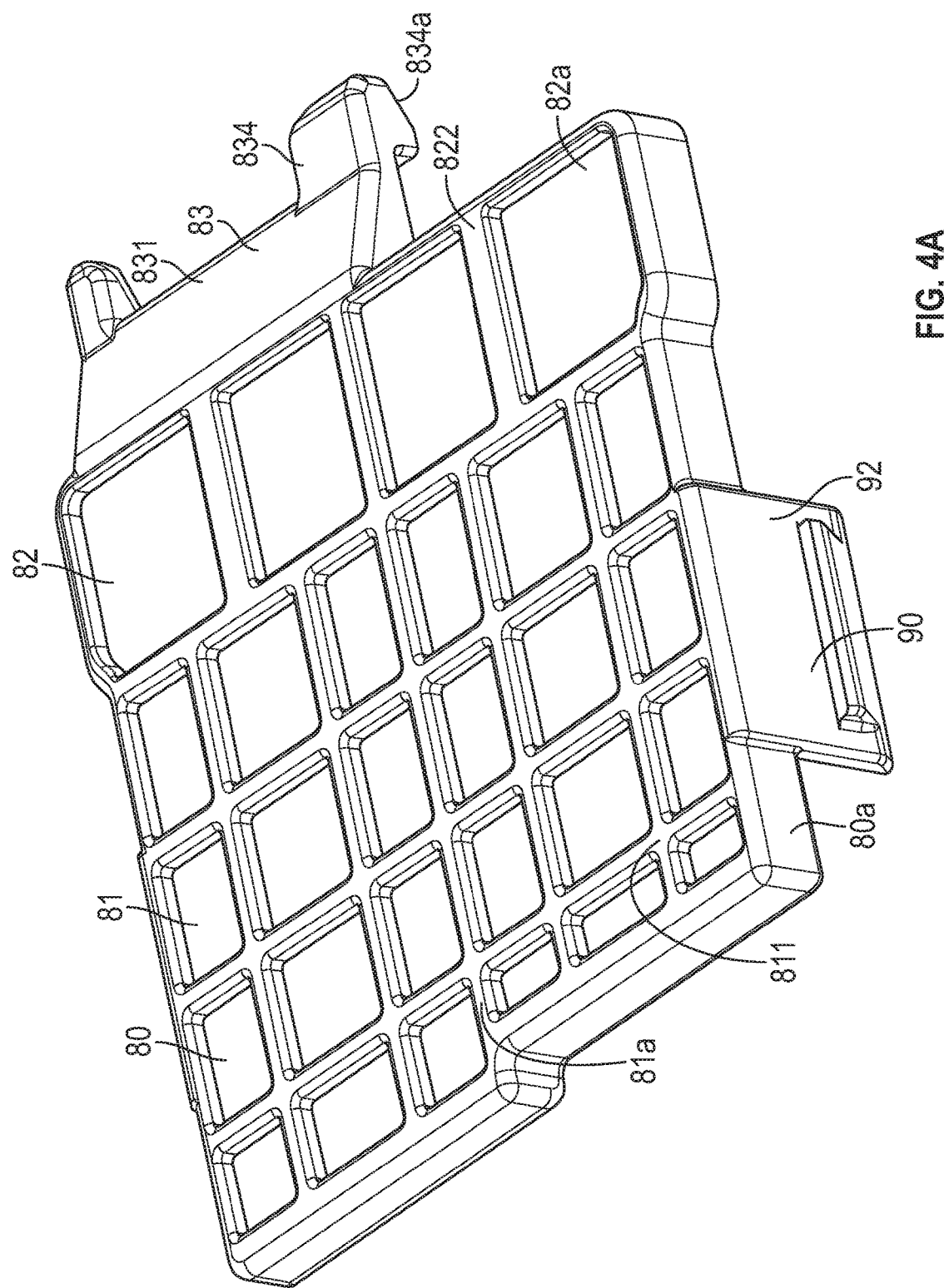
FIG. 4A is a top perspective view of the cover member in accordance with the embodiment of the present invention.
Figure 4B:
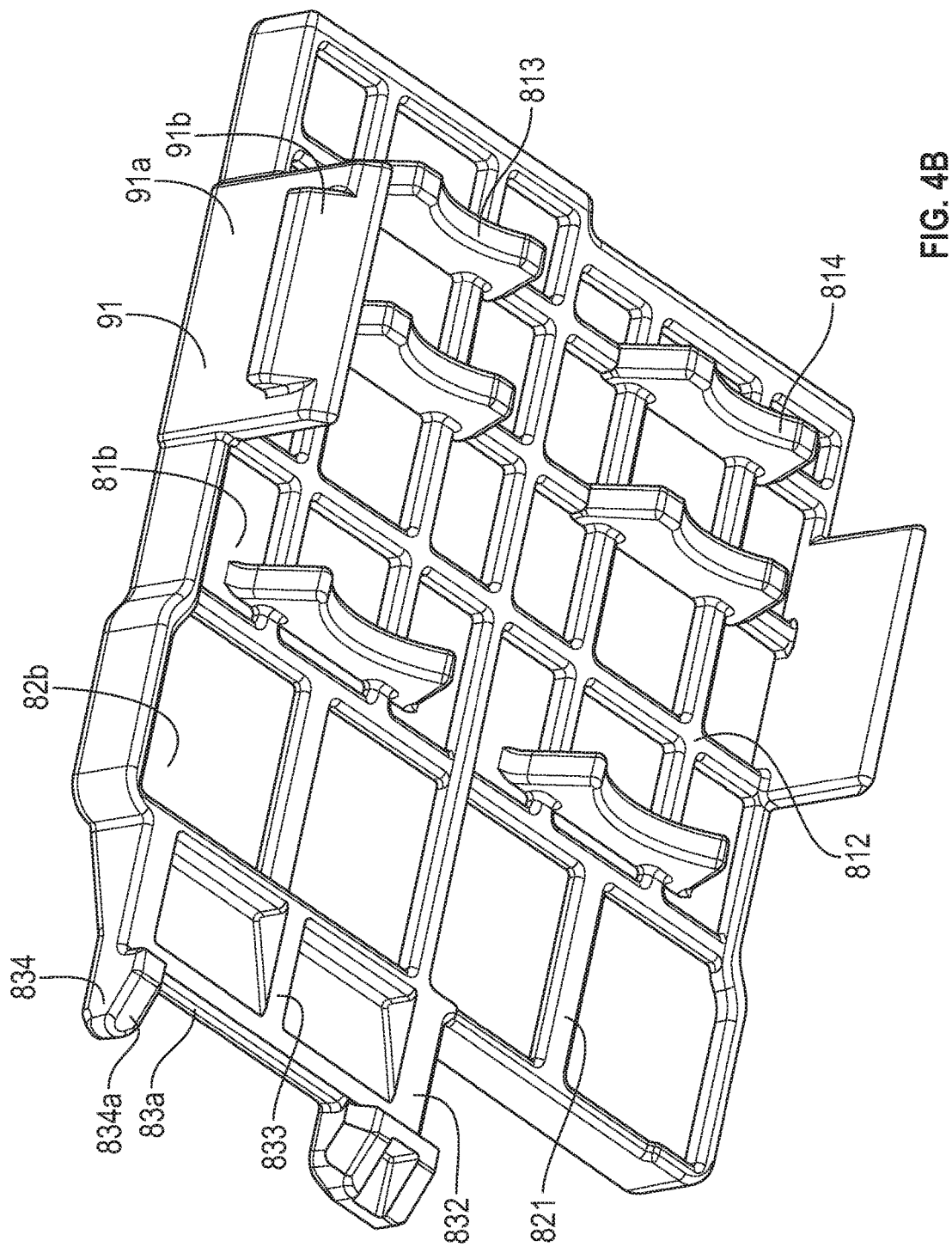
FIG. 4B is a bottom perspective view of the cover member in accordance with the embodiment of the present invention.

The second holding member 500 is shaped in a substantial square cylinder-shape to hold a fuel tube and a tube connector therein; and includes a second holding portion 50, an engaging portion 60 formed on a first lateral portion 502 of the second holding portion 50, and a second fitted portion 70 formed on a second lateral portion 503 of the second holding portion 50 opposed to the first lateral surface 502, as shown in FIGS. 3A and 3B.

The second holding portion 500 has a groove portion 506, in which the fuel tube and the tube connector are held, with an insertion opening opened upwardly. The groove portion 506 extends over an overall length of the second holding portion 50 in a length direction of the second holding member 500, and is surrounded by inner surfaces of a bottom portion 501, the first lateral portion 502, and the second lateral portion 503 of the second holding portion 50. The second holding portion 50 includes a first tube holding portion 51 holding a fuel hose extending from the engine, a second tube holding portion 52 holing a fuel pipe extending from the fuel tank, and a connector holding portion 53 holding the tube connector connecting the fuel hose and the fuel pipe. The first tube holding portion 51 and the connector holding portion 53 of the second holding portion 50 have a structure same to the first tube holding portion 11 and the connector holding portion 13 of the first holding portion 10; therefore, detail explanations are omitted. The second tube holding portion 52 of the second holding portion has a structure substantially same as the second holding portion 12 of the first holding portion 10; however, the second tube holding portion 52 of the second holding portion 50 has a length shorter than that of the second tube holding portion 12 of the first holding portion 10 because no element is formed on upper surface 52*a* of the second tube holding portion 52 while the positioning member 40 is formed on the upper surface 12*a* of the second holding portion 12.

The engaging portion 60 is formed on the first lateral portion 502 of the second holding portion 50. More specifically, the engaging portion 60 is formed on an outer surface of the first lateral portion 502 opposed to an inner surface of the first lateral portion 502 forming the first tube holding portion 51. The engaging portion 60 engages the engaged portion 20 of the first holding member 100.

The engaging portion 60 includes a first engaging portion 601 and a second engaging portion 602 apart from the first engaging portion 601 in the length direction of the second holding member 500 to be inserted in the first engaged hole 202*a* and the second engaged hole 202*b* of the engaged portion 20, respectively. The first engaging portion 601 and the second engaging portion 602 have lengths in the length direction of the second holding member 500 shorter than those of the first engaged hole 202*a* and the second engaged hole 202*b* of the engaged portion 20, so that the first engaging portion 601 and the second engaging portion 602 slide the first engaged hole 202*a* and the second engaged hole 202*b* of the engaged portion 20, respectively.

The first engaging portion 601 includes protruding portions 601*a* arranged apart from each other in the length direction of the second holding member 500 and protruding outwardly from the outer surface of the first lateral portion 502, side portions 601*b* extending downwardly from the protruding portions 601*a* to form L-shapes with the protruding portions 601*a*, and a plate portion 601*c* extending between the side portions 601*b* to face the outer surface of the first lateral portion 502. The protruding portions 601*a* protrude outwardly from an upper portion of the outer surface of the first lateral portion 502, and the plate portion 601*c* connects lower portions of the side portions 601*b* to form a notch portion 601*d*. The plate portion 601*c* has engaging claw portions 601*e* protruding inwardly toward the outer surface of the first lateral portion 502 to engage the first locking plate portion 201c1 of the engaged portion 20.

The second engaging portion 602 includes protruding portions 602a, side portions 602b, plate portion 602c having engaging claw portions 602e, and a notch portion 602d; however, the detail structures are same to the protruding portions 601a, the side portions 601b, the plate portion 601c, the engaging claw portions 601e, and a notch portion 601d. Therefore, detail explanations are omitted.

The second fitted portion 70 is formed on the second lateral portion 503. More specifically, the second fitted portion 70 is formed on an outer surface of the second lateral portion 503 opposed to the inner surface of the second lateral portion 503 forming the second tube holding portion 51. The second fitted portion 70 is engaged with a second fitting portion 92 of the cover member 800, explained later. The second fitted portion 70 has a length in the length direction of the second holding member 500 larger than that of the first fitted portion 30 of the first holding member 100 such that the second fitting portion 92 of the cover member 800 relatively slides in the fitted portion 70.

The second fitted portion 70 includes protruding portions 701 arranged apart from each other in the length direction of the second holding member 500 and protruding outwardly from the outer surface of the second lateral portion 503, side portions 702 extending upwardly from ends of the protruding portions 701 to form L-shapes with the protruding portions 701, and a plate portion 703 extending between the side portions 701 to face the outer surface of the second lateral portion 503. The second fitted portion 70 of the second holding member 500 has a structure substantially same as the first fitted portion 30 of the first holding portion 10, and difference is a length of the second fitted portion 70; therefore, detail explanations other than the length of the second fitted portion 70 are omitted. The second fitted portion 70 has a length in the length direction of the second holding member 500 larger than that of the first fitted portion 30. More specifically, the protruding portions 701 are arranged farther apart from each other than the protruding portions 301 to ensure a length of a depression portion 703a larger than that of the depression portion 303a, and the length of the depression portion 703a is larger than that of the second fitting portion 92 of the cover member 800, so that the second fitting portion 92 relatively slides in the depression portion 703a of the second fitted portion 70.

The cover member 800 will be explained with reference to FIGS. 4A, 4B, and 5A to 5C. The cover member 800 is shaped in a substantial square to match with the upper portions of the first holding member 100 and the second holding member 500. The cover member 800 includes a cover portion 80 to cover the upper portions of the first holding portion 10 and the second holding portion 50, and a fitting portion 90 formed on side portions 80a of the cover portion 80 to engage the first fitted portion 30 of the first holding portion 10 and the second fitted portion 70 of the second holding portion 50. The cover portion 80 includes a first cover portion 81 to cover front portions of the first holding member 100 and the second holding member 500, a second cover portion 82 integrally connected to the first cover portion 81 to cover rear portions of the first holding member 100 and the second holding member 500, and a locking portion 83 protruding outwardly from the second cover portion 82 to engage the positioning member 40 of the first holding member 100.

The first cover member 81 includes outer ribs 811 formed into a lattice shape on an outer surface 81a thereof, inner ribs 812 formed into the lattice shape on an inner surface 81b thereof, a plurality of first holding piece 813 arranged apart from each other in a length direction of the cover member 800 on a first half of the cover member 80 to cover the first holding member 100 and protruding downwardly from the inner surface 81b and the inner ribs 812, and a plurality of second holding pieces 814 arranged apart from each other in the length direction of the cover member 800 on a second half of the cover member 80 to cover the second holding member 500 and protruding downwardly from the inner surface 81b and the inner ribs 812 to be parallel to the plurality of first holding pieces 813.

The second cover member 82 is arranged adjacent to the first cover member 81 in the length direction of the cover member 800 to integrally connect to the first cover member 81. The cover member 82 includes a plurality of outer ribs 822 extending in the length direction of the cover member 800 on an outer surface 82a thereof, and a plurality of inner ribs 821 extending in the length direction of the cover member 800 on an inner surface 82b thereof.

The locking portion 83 protrudes from rear end of the first half of the cover member 82 in the length direction of the cover member 800, and has a substantial hollow triangular pyramid shape.

The locking portion 83 includes an upper portion 831 inclined downwardly in a direction apart from the second cover portion 82, a lower portion 832 having an opening communicated with a space formed in the locking portion 83, a center rib 833 crossing the space in the locking portion 83, and an engaging portions 834 protruding outwardly from side portions of an outer end portion 83a of the locking portion 83. The engaging portions 834 have engaging claws 834a protruding downwardly from a lower portion thereof to engage the positioning member 40.

The fitting portion 90 includes a first fitting portion 91 and a second fitting portion 92 respectively extending downwardly from the side portions 80a of the cover portion 80. The first fitting portion 91 includes a first horizontal portion 91a horizontally extending downwardly from a center portion of the side portion 80a in the length direction of the cover member 800, and a first engaging claw portion 91b protruding outwardly from a lower portion of the horizontal portion 91a. The second fitting portion 92 includes a second horizontal portion 92a and a second engaging claw portion 92b. The second horizontal portion 92a and the second engaging claw portion 92b have the structures same as the first horizontal portion 91a and the first engaging claw portion 91b; therefore, detail explanations are omitted.

Engagement of the first holding member 100 and the second holding member 500 will be explained with reference to FIGS. 1 and 5A to 5C.

The first holding member 100 and the second holing member 500 are engaged each other through the engaged portion 20 and the engaging portion 60.

When the first holding member 100 and the second holing member 500 are engaged each other, firstly, the first engaging portion 601 and the second engaging portion 602 are inserted into the first engaged hole 202a and the second engaged hole 202b, respectively, and the first engaging portion 601 and the second engaging portion 602 are pressed downwardly in a vertical direction. Thereafter, when the engaging claw portion 601e and the engaging claw portion 602e reach the first locking plate portion 201c1 and the second locking plate portion 201c2, the engaging claw portion 601e and the engaging claw portion 602e press the first locking plate portion 201c1 and the second locking plate portion 201c2 outwardly to elastically deform the first locking plate portion 201c1 and the second locking plate portion 201c2, and the first engaging portion 601 and the second engaging portion 602 are further pressed downwardly in the vertical direction. When the engaging claw portion 601e and the engaging claw portion 602e pass over the first locking plate portion 201c1 and the second locking plate portion 201c2, the first locking plate portion 201c1 and the second locking plate portion 201c2 are restored to original positions by self-elasticity; thereby, the engaging claw portion 601e and the engaging claw portion 602e are locked under the first locking plate portion 201c1 and the second locking plate portion 201c2.

As a result, the first holding member 100 and the second holing member 500 are engaged to prevent pull-out of the first engaging portion 601 and the second engaging portion 602 from the first engaged hole 202a and the second engaged hole 202b.

Also, the first engaging portion 601 and the second engaging portion 602 slide the first engaged hole 202a and the second engaged hole 202b of the engaged portion 20, respectively, because the first engaging portion 601 and the second engaging portion 602 have lengths shorter than those of the first engaged hole 202a and the second engaged hole 202b of the engaged portion 20; therefore, the first holding member 100 and the second holding member 500 are capable of relatively sliding each other.

Positioning and engagement of the first holding member 100 and the second holding member 500, and the cover member 800 will be explained with reference to FIGS. 1 and 5A to 5C.

The cover member 800 is positioned on the first holding member 100 and the second holding member 500 through the locking portion 83 and the positioning member 40. The locking portion 83 is inserted into a space between the upper positioning member 401 and the lower positioning member 402 such that a bottom surface of the lower portion 832 is supported on an upper surface of the supporting portions 402a, upper surfaces of the engaging portions 834 is pressed by bottom surfaces of the horizontal portions 401b, and the engaging claws 834a are engaged on rear surfaces of the supporting portions 402a.

The cover member 800 is engaged with the first holding member 100 and the second holding member 500 through the fitting portion 90, the first fitted portion 30, and the second fitted portion 70. The first fitting portion 91 and the second fitting portion 92 are pressed downwardly in the vertical direction to engage the first fitted portion 30 and the second fitted portion. When the first fitting portion 91 and the second fitting portion 92 are pressed downwardly in the vertical direction, the first fitted portion 30 and the second fitted portion 70 are elastically deformed to engage the first fitting portion 91 and the second fitting portion 92.

The second fitting portion 92 relatively slides in the second fitted portion 70 because the length of the depression portion 703a is larger than that of the second fitting portion 92 of the cover member 800; therefore, the cover member 800 is capable of relatively sliding on the second holding member 500, and the cover member 800 is capable of being engaged to the first holding member 100 and the second holding member 500 while the first holding member 100 and the second holding member 500 relatively slide each other.

As explained above, in the structure of the embodiment, the first holding member 100 and the second holding member 500 relatively slide each other, and the cover member 800 relatively slides on the second holding member 500 while being engaged to the first holding member 100 and the second holding member 500; therefore, the displacement of the fuel tubes can be corrected.

The cover member 800 covers the upper portions of the first holding member 100 and the second holding member 500; therefore, the fuel tubes can be protected from the impact generated in the collision of the vehicle.

The first holding member 100 and the second holding member 500 are engaged in the vertical direction; therefore, the coupling clamp 1 can be miniaturized to be installed in the limited space.

In the embodiment, the positioning member 40 is formed in the first holding member 100, however, the positioning member 40 may be formed in the second holding member 500; the length of the second fitted portion 70 is larger than that of the first fitted portion 30, however, the length of the first fitting portion 30 may be larger than that of the second fitted portion 70; the engaging portion 60 includes two of the first engaging portion 601 and the second engaging portion 602, and the engaged portion 20 includes two of the first engaged hole 202a and the second engaged hole 202b, however, the number of the engaging portion and the engaged hole are not limited.

The above description simply illustrates the principle of the invention. Furthermore, modifications and alterations are possible for those skilled in the art, and the invention is not limited to the heretofore illustrated and described exact configurations and applications. The invention is limited by claims.

What is claimed is:
1. A coupling clamp comprising:
 a pair of holding members adapted to hold a pair of tubular members to be arranged parallel to each other, the pair of holding members including:
  a first holding member having a U-shape in a cross section in a length direction of the first holding member to form a first opening opened upwardly, an engaging portion extending vertically from one side surface of the first holding member, and a first fitted portion on another side surface opposed to the one side surface of the first holding member, and
  a second holding member arranged side by side with the first holding member, and having a U-shape in a cross section in a length direction of the second holding member to form a second opening opened upwardly, an engaged portion extending vertically from one side surface of the second holding member facing the one side surface of the first holding member, and a second fitted portion on another side surface opposed to the one side surface of the second holding member; and
 a cover member arranged on the pair of holding members and covering the first opening and the second opening, the cover member including a first fitting portion on one side surface of the cover member corresponding to the another side surface of the first holding member to fit into the first fitted portion and a second fitting portion on another side surface of the cover member corresponding to the another side surface of the second holding member to fit into the second fitted portion,
 wherein the engaging portion and the engaged portion are engaged in a vertical direction relative to the length directions of the first holding member and the second holding member such that the first holding member relatively slides to the second holding member.
2. A coupling clamp according to claim 1, wherein the engaged portion includes an engaged hole in which the engaging portion is inserted, and the engaging portion has a width in the length direction of the first holding member smaller than that of the engaged hole in the length direction of the second holding member to slide in the engaged hole.

3. A coupling clamp according to claim 1, wherein the first holding member further includes at least one another engaging portion arranged apart from the engaging portion in the length direction of the first holding member.

4. A coupling clamp according to claim 1, wherein the first fitted portion and the second fitted portion respectively have a first fitted hole portion and a second fitted hole portion in which the first fitting portion and the second fitting portion are inserted, and the first fitted hole portion or the second fitted hole portion has a width in the length direction of the first holding member or the second holding member greater than that of the first fitting portion or the second fitting portion in the length direction of the first holding member or the second holding member such that the first fitting portion or the second fitting portion relatively slides in the first fitted hole or the second fitted hole in conjunction with relative slide between the first holding member and the second holding member.

5. A coupling clamp according to claim 4, wherein the first holding member or the second holding member includes a positioning member, and the cover member includes a locking portion engaged to the positioning member to position the cover member on the pair of holding members.

6. A coupling clamp according to claim 3, wherein the second holding member further includes at least one another engaged portion adjacent to the engaged portion in the length direction of the second holding member to engage the at least one another engaging portion.

7. A coupling clamp according to claim 1, wherein the first holding member, the second holding member, and the cover member are formed separately from each other.

8. A coupling clamp according to claim 1, wherein the engaging portion includes a protruding part protruding outwardly from the one side surface of the first holding member, and a plate part extending downwardly from an outer end of the protruding part to form a L-shape with the protruding part, and the engaged portion includes a frame portion having side plate portions apart from each other in the length direction of the second holding member and protruding from the one side surface of the second holding member, and an outer plate portion extending between the side plate portions to connect outer ends of the side plate portions and facing the one side surface of the second holding member; and an engaged hole surrounded by the frame portion in which the engaging portion is inserted.

9. A coupling clamp according to claim 8, wherein the plate part includes a claw part protruding toward the one side surface of the first holding member from an inner surface of the plate part, and the engaged portion further includes a locking plate portion extending downwardly from an inner surface of the outer plate portion and inclined toward the one side surface of the second holding member to lock the engaging portion by contacting the claw part and the locking plate portion when the engaging portion and the engaged portion are engaged to each other.

10. A coupling clamp according to claim 9, wherein the first fitting portion includes a first horizontal portion extending downwardly from the one side surface of the cover member and a first engaging claw portion protruding outwardly from the first horizontal portion; and the second fitting portion includes a second horizontal portion extending downwardly from the another side surface of the cover member and a second engaging claw portion protruding outwardly from the second horizontal portion, and the first fitted portion includes first protruding portions apart from each other in the length direction of the first holding member, each protruding outwardly from the another side surface of the first holding member to form a L-shape in the cross section in the length direction of the first holding member, a first plate portion extending upwardly from outer ends of the first protruding portions, and a first notch portion formed under the first plate portion between the first protruding portions in which the first engaging claw portion is inserted to engage the first fitting portion and the first fitted portion; and the second fitted portion includes second protruding portions apart from each other in the length direction of the second holding member, each protruding outwardly from the another side surface of the second holding member to form a L-shape in the cross section in the length direction of the second holding member, a second plate portion extending upwardly from outer ends of the second protruding portions, and a second notch portion formed under the second plate portion between the second protruding portions in which the second engaging claw portion is inserted to engage the second fitting portion and the second fitted portion.

11. A combination, comprising: a coupling clamp comprising:
a pair of holding members adapted to hold a pair of tubular members to be arranged parallel to each other, the pair of holding members including;
a first holding member having a U-shape in a cross section in a length direction of the first holding member to form a first opening opened upwardly, an engaging portion extending vertically from one side surface of the first holding member, and a first fitted portion on another side surface opposed to the one side surface of the first holding member, and
a second holding member arranged side by side with the first holding member, and having a U-shape in a cross section in a length direction of the second holding member to form a second opening opened upwardly, an engaged portion extending vertically from one side surface of the second holding member facing the one side surface of the first holding member, and a second fitted portion on another side surface opposed to the one side surface of the second holding member;
and a cover member arranged on the pair of holding members and covering the first opening and the second opening, the cover member including a first fitting portion on one side surface of the cover member corresponding to the another side surface of the first holding member to fit into the first fitted portion and a second fitting portion on another side surface of the cover member corresponding to the another side surface of the second holding member to fit into the second fitted portion,
wherein the engaging portion and the engaged portion are engaged in a vertical direction relative to the length direction directions of the pair of holding members first holding member and the second holding member such that the first holding member relatively slides to the second holding member and the first holding member is arranged adjacent to the second holding member and two first tubular members connected and held in the first holding member; and two second tubular members connected and held in the second holding member.

* * * * *